United States Patent
Fuss et al.

(10) Patent No.: US 8,683,531 B2
(45) Date of Patent: Mar. 25, 2014

(54) DIGITAL BROADCASTING METHOD

(75) Inventors: Tim Fuss, Hamburg (DE); Christian Schaupmann, Bad Laer (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 13/452,068

(22) Filed: Apr. 20, 2012

(65) Prior Publication Data

US 2012/0201328 A1 Aug. 9, 2012

Related U.S. Application Data

(63) Continuation of application No. PCT/EP2010/065820, filed on Oct. 20, 2010.

(60) Provisional application No. 61/253,900, filed on Oct. 22, 2009.

(30) Foreign Application Priority Data

Oct. 22, 2009 (DE) .......................... 10 2009 050 312

(51) Int. Cl.
*H04N 7/18* (2006.01)
(52) U.S. Cl.
USPC ............. 725/76; 725/63; 725/64; 725/65; 725/66; 725/67; 725/68; 725/69; 725/70; 725/71; 725/72; 725/73; 725/74; 725/75; 725/77; 375/295; 709/231; 455/406; 382/128; 382/249

(58) Field of Classification Search
CPC ..................................... H04N 7/18; H04N 7/20
See application file for complete search history.

(56) References Cited

U.S. PATENT DOCUMENTS

| | | | |
|---|---|---|---|
| 6,535,717 B1* | 3/2003 | Matsushima et al. | 455/18 |
| 6,701,528 B1* | 3/2004 | Arsenault et al. | 725/89 |
| 7,624,415 B1* | 11/2009 | Zhang et al. | 725/95 |
| 7,995,494 B2* | 8/2011 | Habib et al. | 370/252 |
| 8,001,575 B2* | 8/2011 | Batteram et al. | 725/97 |
| 8,194,759 B2* | 6/2012 | Hagai et al. | 375/240.29 |
| 2003/0009576 A1* | 1/2003 | Apostolopoulos et al. | 709/231 |
| 2003/0081671 A1* | 5/2003 | Ishida et al. | 375/240 |
| 2004/0180707 A1* | 9/2004 | Barrett | 455/575.9 |
| 2006/0117360 A1* | 6/2006 | Cooper et al. | 725/100 |

(Continued)

FOREIGN PATENT DOCUMENTS

| | | |
|---|---|---|
| DE | 102009050312 A1 | 5/2011 |
| WO | 03005761 A1 | 1/2003 |
| WO | 2007130312 A2 | 11/2007 |
| WO | 2009126253 A1 | 10/2009 |

OTHER PUBLICATIONS

International Search Report for Application No. PCT/EP2010/065820 dated Dec. 20, 2010.

*Primary Examiner* — Nasser Goodarzi
*Assistant Examiner* — Paul Graham
(74) *Attorney, Agent, or Firm* — Lerner, David, Littenberg, Krumholz & Mentlik, LLP

(57) ABSTRACT

According to an exemplary embodiment of the invention, a digital data stream is divided into at least two complementary digital substreams and delayed in time. The first digital substream and the second digital substream are transmitted by the broadcasting systems with a time offset in accordance with the broadcasting principle such that any receiver can use the respectively intact part of the other complementary digital substream in order to ensure a seamless media reception when a break in the transmission or reception occurs.

13 Claims, 4 Drawing Sheets

(56) References Cited

U.S. PATENT DOCUMENTS

| | | |
|---|---|---|
| 2006/0165307 A1* | 7/2006 | Kondo et al. .................. 382/249 |
| 2006/0212909 A1* | 9/2006 | Girard et al. .................... 725/73 |
| 2008/0123916 A1* | 5/2008 | Adams et al. ................. 382/128 |
| 2008/0127278 A1* | 5/2008 | Bonar .............................. 725/76 |
| 2008/0141314 A1* | 6/2008 | Lemond et al. ................. 725/76 |
| 2008/0182548 A1* | 7/2008 | Pattison et al. ............... 455/406 |
| 2008/0247460 A1* | 10/2008 | Kang et al. ............... 375/240.02 |
| 2009/0119721 A1* | 5/2009 | Perlman et al. ................. 725/76 |
| 2012/0063522 A1* | 3/2012 | Fuss et al. ..................... 375/259 |

* cited by examiner

DIGITAL BROADCASTING METHOD

CROSS-REFERENCE TO RELATED APPLICATIONS

This application is a continuation of International Application No. PCT/EP2010/065820, filed Oct. 20, 2010, which claims the benefit of the filing date of German Patent Application No. 10 2009 050 312.9, filed on Oct. 22, 2009 and of U.S. Provisional Patent Application No. 61/253,900, filed on Oct. 22, 2009, the disclosures of which applications are herewith incorporated herein by reference.

FIELD OF THE INVENTION

The invention pertains to broadcast engineering. The invention specifically pertains to a digital broadcasting method, a broadcasting system, an airplane, a program element and a computer-readable medium.

TECHNOLOGICAL BACKGROUND

Conventional broadcasting systems transmit contents to the ambient environment several times in order to ensure that parts of the transmitted contents that are missing due to a potentially occurring break in the transmission between the broadcasting system and the receiver were already transmitted at least once beforehand. In the prior art, it is also known to fill buffers upon corresponding requests of the individual subscribers, wherein it is disadvantageous that a brief but significant increase of the data traffic occurs. The seamless reception of external media streams represents a major technical challenge, in particular, in fast-moving vehicles such as aircraft.

During the transition from one service area into an adjacent service area or a so-called hand-over, an interruption of the data connection inevitably occurs if the communication system does not support any multipoint links. This termination is responsible for the interruption of the media stream to be transmitted. Although it is not necessary to log on and log off during a station hand-over in broadcasting systems, the data stream is also briefly interrupted in this case due to the required synchronization such that the resulting transmission is incomplete and the comfort of the user within the vehicle is compromised.

SUMMARY OF THE INVENTION

An objective of the invention can be seen in ensuring that external data streams are made available in an improved and continuous fashion in a moving vehicle.

A digital broadcasting method of a broadcasting system for realizing a seamless reception of a digital data stream in a moving vehicle, a broadcasting system for broadcasting a digital data stream, an airplane, a program element and a computer-readable medium according to the characteristics of the independent claims are disclosed. Developments of the invention result from the dependent claims.

The described exemplary embodiments likewise pertain to the digital broadcasting method, the broadcasting system, the airplane, the program element and the computer-readable medium. For example, characteristics described below with reference to the method can also be correspondingly implemented as characteristics in the airplane, the broadcasting system, the program element and the computer-readable medium and vice versa.

It should be noted that procedural steps may also be carried out in any sequence other than the explicitly cited sequence in each of the exemplary embodiments of the invention described below without deviating from the scope of the invention.

It should furthermore be noted that bidirectional connections may also be used in addition to unidirectional connections when the invention is implemented. For example, a confirmative reply may be transmitted by an airplane. However, a different type of communication from the airplane to the broadcasting system would also be conceivable.

According to an exemplary embodiment of the invention, a digital broadcasting method of a broadcasting system for realizing a seamless reception of a digital data stream in a moving vehicle is disclosed. In this case, the method features the steps of making available a data stream to be transmitted by a transmitter and dividing the data stream into a first digital substream and a second digital substream, wherein the two substreams are complementary to one another. Further steps are generating a time offset dt between the first and the second substream, transmitting the first and the second substream to a receiver in the moving vehicle with the time offset dt in the form of a broadcast by means of the broadcasting system such that the first substream is transmitted earlier than the second substream. Additional steps of the method are delaying the first substream in the moving vehicle and recombining both received substreams into an output stream in the moving vehicle.

The data stream may consist of a media stream in this and any other exemplary embodiment.

In addition, a version of lower quality than the original can be reproduced from each substream.

According to this method, the media streams can be transmitted by all broadcasting systems of the region to be serviced in the described fashion.

In other words, a method for the seamless media reception in a moving vehicle via an external data connection during a hand-over situation is disclosed. In this and any other exemplary embodiment, it is of decisive importance that the data stream to be transmitted by the broadcasting system is constant or nearly constant in order to ensure a seamless reception in the vehicle despite an interruption.

According to this exemplary embodiment, a continuous reception of media in the moving vehicle is realized during digital broadcasts, namely even if the communication link is briefly interrupted, for example, in order to establish a new connection. In this case, the average transmission rate can be maintained, if desired.

In this and any other exemplary embodiment of the invention, both digital substreams can be transmitted to the receiver by utilizing a single transmission path. However, the first and the second digital substream may also be transmitted to the receiver on different transmission paths. In this context, the term receiver always refers to a part of the moving vehicle or the entire moving vehicle.

The original data stream likewise may be divided into more than two digital substreams in this and any other exemplary embodiment of the invention. According to an exemplary embodiment of the invention, it would be possible, for example, to adapt the number of substreams to the available transmission paths.

Another significant advantage of the invention can be seen in that the generated digital data substreams can be received and utilized by all receivers similar to the broadcasting principle. Transmissions do not have to be specially managed and adapted for each receiver because breaks in the reception generally can be bridged with the method at any time.

In addition, the fault tolerance of the entire transmission can be increased due to the fact that, if a fault occurs in one or more data streams or media streams, the data in the stream/the remaining streams still makes it possible to realize a reproduction, however, of inferior quality. Consequently, a fault in individual streams has the same effect as an interruption of streams as it occurs in a hand-over situation.

It would furthermore be possible that the recombination takes place while at least the second substream is still transmitted to the moving vehicle.

In this and any other exemplary embodiment of the invention, the term "complementary" should be interpreted in such a way that the addition, i.e., the recombination, of two complementary substreams once again results in the original, undivided digital data stream in its initial quality.

Due to the complementary character of the two digital streams, the first digital substream respectively contains, in a manner of speaking, an information bit that has a complementary counterpart in the second digital substream. In this case, a different location in this digital substream respectively describes a different information bit in this digital substream or a different complementary information bit in the complementary digital substream.

In the context of the invention, the term "moving vehicle" furthermore refers to data being transmitted from a stationary broadcasting system to the moving vehicle by means of broadcasting technology. It is likewise possible that the broadcasting system moves or the intensity of its transmission fluctuates to such a degree that an interruption occurs.

In other words, the digital broadcasting system may also move and the vehicle may also be stationary in this and any other exemplary embodiment. It would likewise be possible that the digital broadcasting system and the vehicle are both stationary, but the intensity of the data connection on this transmission path is terminated and needs to be reestablished.

In summary, the invention allows a seamless reception of media in a vehicle during a relative movement between the broadcasting station and the vehicle.

In this case, the generation of a time offset can be realized, for example, by means of a time-delayed transmission.

The delay of the first substream is furthermore realized on the side of the vehicle, such that the time offset dt is exactly compensated. If desired, however, the generated time offset may not be exactly compensated by the delay of the first substream in the vehicle. Furthermore it is possible to carry out a step, in which the already transmitted part of the first substream is intermediately stored.

It is also possible to generate a time offset dt such that the two substreams still overlap in time during the transmission. In this case, the delay may still occur during the transmission, for example, during the transmission of at least the second substream. However, it would also be possible to generate the time offset before the start of the transmission of one of the two substreams by the broadcasting system.

In other words, a content reformatting of the content of the initial digital data stream or media stream takes place in accordance with the invention, wherein this reformatting represents a type of data processing that once again results in the seamless reproduction of a media stream in a moving vehicle.

If a gap is created in the two digital substreams due to a termination of the connection, this gap can once again be filled in the vehicle by means of the described method due to the time offset between the two substreams, namely with partial but complementary information of the other complementary substream or substreams as described in greater detail below.

In the normal case, in which both substreams arrive and therefore are stored in the receiver of the moving vehicle, the recombined output stream can be displayed in high quality, namely the original quality. However, gaps are created in the digital substreams if a break in the transmission occurs, for example, due to a hand-over.

Due to the time offset between the transmissions of the two substreams, a first gap is created in the first digital substream at a location referred to the information in the substream that differs from the location of a second gap being created in the second digital substream.

Due to the complementary character of the two digital streams, the first digital substream respectively contains, in a manner of speaking, an information bit that has a complementary counterpart in the second digital substream. In this case, a different location in this digital substream respectively describes a different information bit in this digital substream or a different complementary information bit in the complementary digital substream. This is clearly illustrated, for example, in FIG. 8.

The inventive method makes it possible to fill the first gap created in the first digital substream with complementary information bits of the second digital substream and vice versa. Although the quality briefly deteriorates in this case because only part of the original information of the original data stream is available, the media reproduction is never interrupted such that the comfort and the safety in the vehicle are improved depending on the application of the transmitted data.

In this and any other exemplary embodiment of the invention, the moving vehicle may consist of any data stream or media stream receiver. In other words, the vehicle may consist of a land craft, a watercraft or an aircraft. The invention can likewise be used between subscribers of satellite communication services.

According to another exemplary embodiment of the invention, the creation of a gap in the output stream in the vehicle is prevented in case of an interruption in the transmission that is shorter than permitted by the buffer by making available information bits from both digital substreams. In other words, two gaps created in the recombined output stream due to an interruption in the transmission are filled with information bits of both digital substreams by means of the method. Consequently, the original digital stream can be seamlessly displayed in the vehicle by means of the output stream.

According to another exemplary embodiment of the invention, interrelated complementary parts of the first and the second substream are respectively recombined during the recombination.

In other words, the information bits of both digital substreams are once again recombined due to the recombination such that, in case of no interruption in the transmission, the original information of the data stream is reproduced with the same quality as prior to its division.

According to another exemplary embodiment of the invention, the digital broadcasting method furthermore comprises the step of playing the recombined output stream in the moving means of transport, wherein the delaying comprises the storage of a transmitted part of the first substream such that a break in the transmission during the reception of the broadcast with a duration up to the length of the time offset can be compensated in such a way that the playing of the output stream takes place continuously.

According to another exemplary embodiment of the invention, the digital broadcasting method furthermore comprises the steps of packing the two complementary, time-delayed substreams by means of the broadcasting system and unpacking the two complementary, time-delayed substreams in the moving vehicle, wherein the transmission of both substreams takes place on a single transmission path.

This exemplary embodiment is illustrated, for example, in FIG. 8. It should once again be noted that it is possible to produce a plurality of digital substreams and that different transmission paths may also be used for the digital substreams.

The present substreams can be packed, encapsulated or reorganized according to known methods. The processing in the lower ISO layers is not changed in this method because the method merely concerns the adaptation of media streams in the upper ISO layers.

According to another exemplary embodiment of the invention, the data stream to be transmitted is a digital audio stream, wherein the dividing comprises the reduction of the audio stream to two mono channels, wherein the substream is composed of the data of the first mono channel of the audio stream and the second substream is composed of the data of the second mono channel of the audio stream.

In case of a corresponding break in the transmission, i.e., the media reception, an audio signal that merely contains audio information for the left loudspeaker channel or the right loudspeaker channel at a few isolated locations is made available to the user due to the utilization of the present exemplary embodiment of the invention. However, the method makes it possible to prevent an interruption in the transmission.

According to another exemplary embodiment of the invention, the data stream to be transmitted is a digital video stream, wherein the first substream is composed of pixels with an even ordinal number and the second substream is composed of pixels with an odd ordinal number.

In this context, pixels should be interpreted as the elementary components of an image of the video stream.

According to another exemplary embodiment of the invention, the data stream to be transmitted is a digital video stream, wherein the first substream is composed of the data of lines with an even ordinal number and the second substream is composed of the data of lines with an odd ordinal number.

In this context, the lines refer to an image that forms part of the video stream.

According to another exemplary embodiment of the invention, the data stream to be transmitted is a digital video stream, wherein the first substream is composed of images of the video stream with an even ordinal number and the second substream is composed of images of the video stream with an odd ordinal number.

According to another exemplary embodiment of the invention, the digital broadcasting method furthermore comprises the steps of calculating intermediate images and inserting intermediate images between images in a substream such that a choppy reproduction on the receiving end is prevented in case a break occurs in the transmission over the external data connection.

In other words, this exemplary embodiment divides the video stream into images. The images are alternately distributed over the two substreams. In order to realize an adequate reproduction with only one stream, intermediate images should be calculated because movements in the image could now be choppy due to the fact that people perceive image sequences of less than 24 images per second as individual images rather than continuous flowing movements. In this context, it is of decisive importance that each of the digital substreams features a complete content, however, of reduced quality. This not only applies to this exemplary embodiment of the invention, but to the invention in general.

According to another exemplary embodiment of the invention, the recombination is carried out such that the original data stream is reproduced from both substreams without a loss of quality of the data stream on the receiving end.

According to another exemplary embodiment of the invention, the vehicle is an airplane and the broadcasting system is a ground-based communication station.

In this context, the inventive method may also be applied to satellite-based transmission methods. According to the described exemplary embodiments, the inventive method also makes it possible to reformat broadcasts that originate from a satellite or are forwarded by a satellite and interrupted with respect to their content such that a seamless reception in the moving vehicle is achieved.

According to another exemplary embodiment of the invention, the time offset lies between 10 and 40 seconds.

According to another exemplary embodiment an inventive broadcasting method is presented, wherein the data stream to be transmitted is made available at a time T1, the data stream is divided at a time T2, the time offset is generated at a time T3 and the transmission of a first substream starts at a time T4. The transmission of the second substream starts at a time T5, wherein T4+dt=T5 applies. A transmission of a first part of the first substream to the receiving end takes place at a time T6, wherein the transmission of a first part of the second substream to the receiving end takes place at a time T7, wherein the recombination of both substreams takes place no earlier than the time T7, and wherein T1<T2<T3<T4<T5<T6<T7 applies.

According to another exemplary embodiment of the invention, a broadcasting system for broadcasting a digital data stream is disclosed, wherein the broadcasting system is realized in such a way that it carries out the steps described above or below in combination with a vehicle.

According to another exemplary embodiment of the invention, an airplane with a receiver for receiving a digital broadcast signal is disclosed, wherein the airplane comprises a receiver, and wherein the receiver is realized in such a way that it carries out the steps described above or below in combination with a broadcasting system.

According to another exemplary embodiment of the invention, the recombination takes place a certain time after the transmission of a first part of the first substream to the receiver.

According to another exemplary embodiment of the invention, the time offset is longer than the average duration of an interruption in the transmission during a "hand-over" between the airplane and two overflown broadcasting systems.

According to another exemplary embodiment of the invention, a program element is disclosed that, when executed on a processor of a broadcasting system, instructs the processor to carry out the steps described above and below.

The processor may furthermore be integrated into an airplane.

According to another exemplary embodiment of the invention, a computer-readable medium is disclosed, on which a program element is stored that, when executed on a processor, instructs the processor to carry out the steps described above and below.

The program element may consist, for example, of part of software stored on the processor. The program element may already utilize the invention from the beginning or be prompted to utilize the invention by means of an update (update).

Exemplary embodiments of the invention are described below with reference to the figures.

DETAILED DESCRIPTION OF EXEMPLARY EMBODIMENTS

The figures show schematic illustrations that are not true-to-scale.

In the following description of the figures, identical or similar elements are identified by the same reference symbols.

Figure 1:
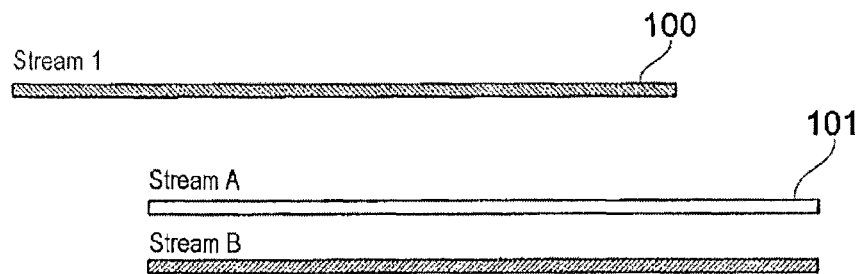
FIG. 1 shows a schematic two-dimensional representation of a first and a second digital substream according to an exemplary embodiment of the invention.

FIG. 1 shows a digital data stream 100 that may also consist of a media stream and, according to the inventive method, was divided into a first digital substream 101 and a second digital substream 102 in such a way that the two substreams are complementary to one another. This means, among other things, that each substream features a complete content, however, of reduced quality in comparison with the data stream 100.

Figure 2:
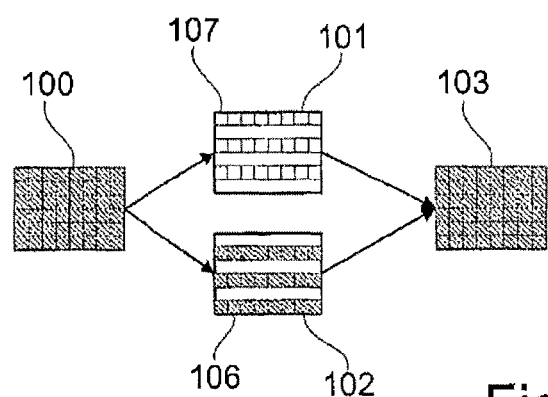
FIGS. 2-4 show schematic two-dimensional representations of different first and second substreams according to an exemplary embodiment of the invention.

FIG. 2 shows a digital data stream 100 to be transmitted that may also consist of a media stream, a first digital substream 101, a second digital substream 102 and the recombined output stream 103. In this case, the first substream is composed of the data of lines with an even ordinal number 106 and the second substream is composed of the data of lines with an odd ordinal number 107.

Figure 3:
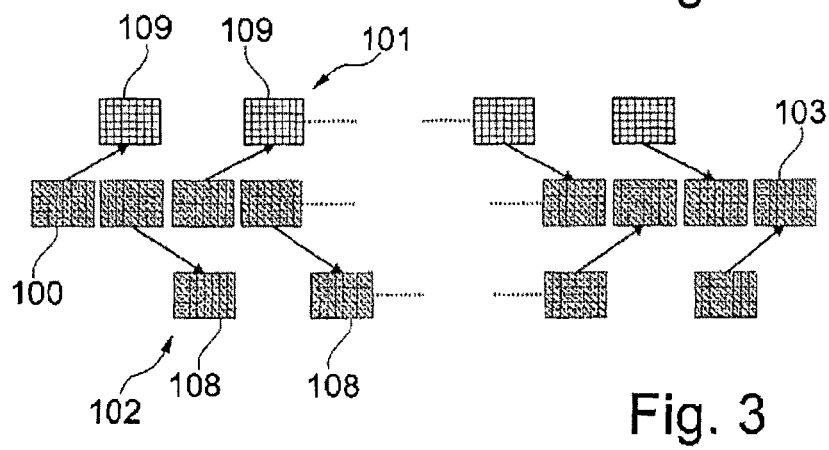
Figure 4:
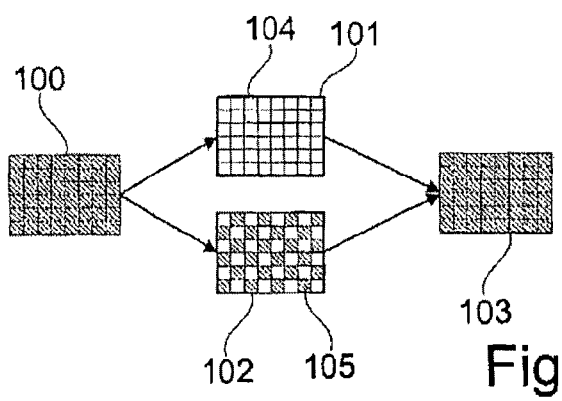

FIG. 3 as well as FIG. 4 show a digital data stream 100 that may also consist of a media stream and is divided into a first substream 101 and a second digital substream 102. In both figures, the output stream is subsequently recombined from both received substreams. In FIG. 3, the first substream is composed of images of the video stream with an even ordinal number 108 and the second substream is composed of images of the video stream with an odd ordinal number 109.

In FIG. 4, in contrast, the first substream is composed of pixels of the video stream with an even ordinal number 104 and the second substream is composed of pixels with an odd ordinal number 105.

Figures 5A, 5B, 5C:
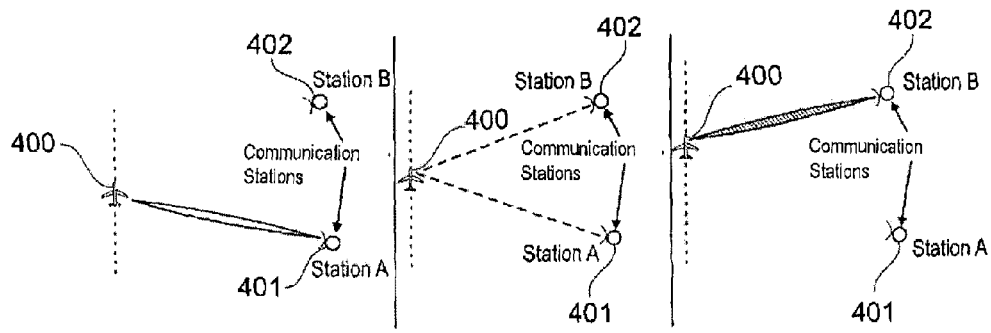
FIGS. 5a-5c show a schematic two-dimensional representation of an airplane and two broadcasting systems in three different situations during a hand-over, in which a method according to an exemplary embodiment is used.

FIGS. 5a-5c show a schematic representation of a vehicle that is realized in the form of an airplane 400 in this case. Due to the movement of the airplane, it reaches the boundary of the transmission range of the first broadcasting system 401 and needs to be serviced by the second broadcasting system 402.

The airplane receives data due to a broadcast by two broadcasting systems 401 and 402, namely first from the broadcasting system 401 (see FIG. 5a) and then from the broadcasting system 402 (see FIG. 5c), and utilizes the method according to an exemplary embodiment of the invention. Likewise, both broadcasting system use a method according to an exemplary embodiment of the invention. According to FIG. 5b in the middle, a data stream can neither be received from the first nor from the second broadcasting system at a certain time, namely the so-called hand-over. Due to the inventive method according to one of the exemplary embodiments described above or below, a seamless reception, e.g., of a media stream can be ensured in the airplane despite an interruption (see FIG. 5b). This can improve the safety as well as the comfort in the airplane.

Figure 6:
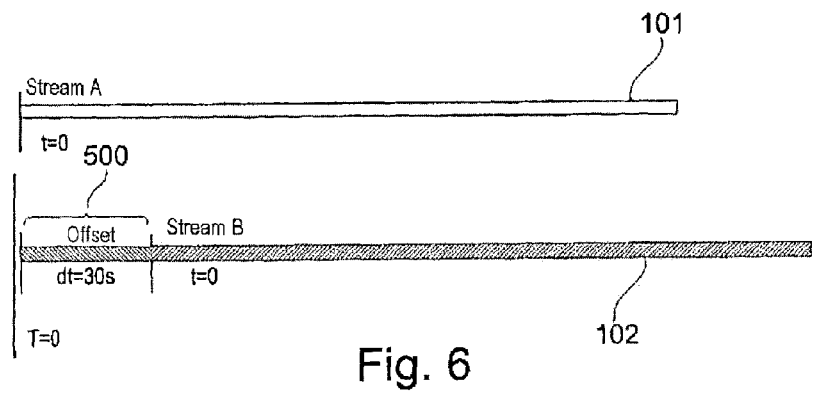
FIG. 6 shows a schematic two-dimensional representation of two time-delayed substreams according to an exemplary embodiment of the invention.

FIG. 6 shows a schematic representation of a time offset dt 500 between the first substream 101 and the second substream. In this example, the duration of dt is 30 seconds such that the first complementary substream 101 is transmitted from the broadcasting system to the moving vehicle with a 30 second advance.

Figure 7:
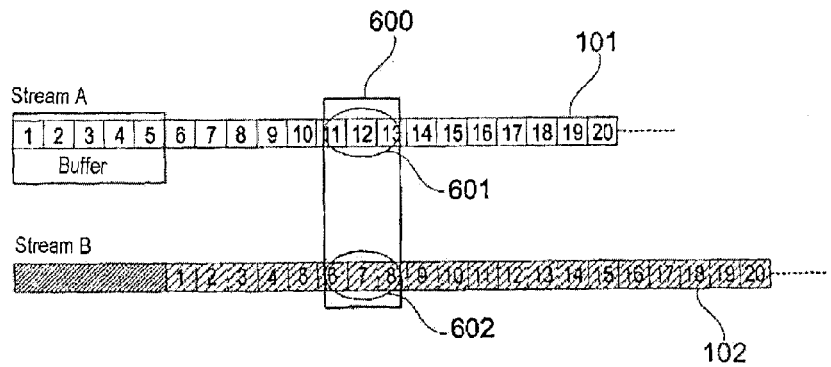
FIG. 7 shows a schematic two-dimensional representation of two substreams according to an exemplary embodiment of the invention.

FIG. 7 shows a first digital substream 101 that contains the complete information, however, of reduced quality that is indicated in an exemplary fashion with the reference symbols 1 to 20. FIG. 7 furthermore shows the second substream 102 that also contains the entire information indicated with the reference symbols 1 to 20, however, in the form of reduced quality. In this context, the quality reduction refers to a comparison with the initial data stream.

FIG. 7 furthermore shows that the break in the transmission 600 creates a first gap 601 in the first substream and a second gap 602 in the second substream. In this example, the information blocks 11-13 would be missing in the first substream and the information blocks 6-8 would be missing in the second substream. Due to the time delay realized between the two substreams in accordance with the invention, such an interruption respectively creates gaps in the substreams that lie at different locations with respect to the complementarity of the two substreams. In other words, the gap in one substream can be respectively replaced with the complementary part of the other intact substream. This is illustrated in detail in the following FIG. 8.

Figure 8:
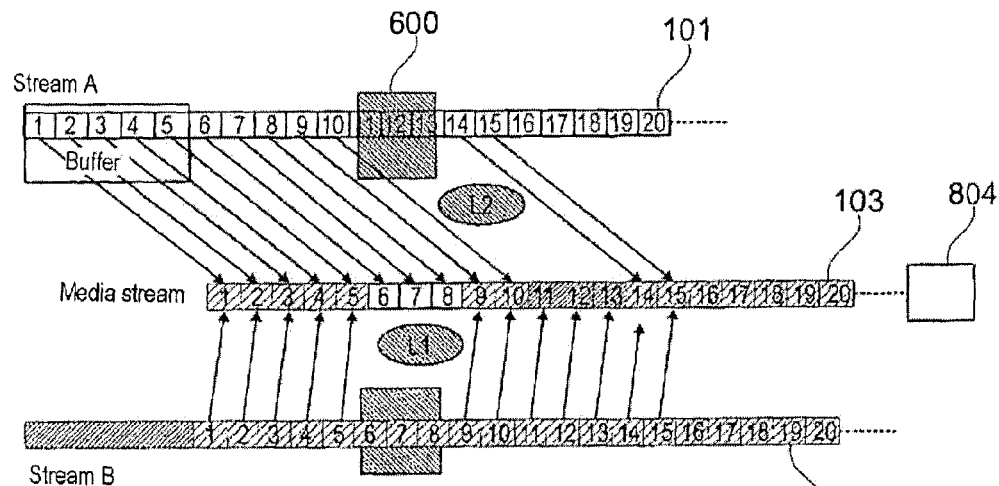
FIG. 8 shows a schematic two-dimensional representation of a recombination of two substreams into an output stream according to an exemplary embodiment of the invention.

FIG. 8 clearly shows that the information bits 6-8 of the second substream 102 can be made available for the recombined output stream 103 to be played in the vehicle despite the interruption 600. In addition, the information bits 11 to 13 of the first digital substream 101 of the method can be implemented in the output stream 103. FIG. 8 furthermore clearly shows that a seamless reception 804 in the vehicle can be realized despite the interruption 804. In this and any other exemplary embodiment, it is of decisive importance that the data stream to be transmitted by the broadcasting system is constant or nearly constant in order to ensure a seamless reception in the vehicle despite an interruption.

Figure 9:
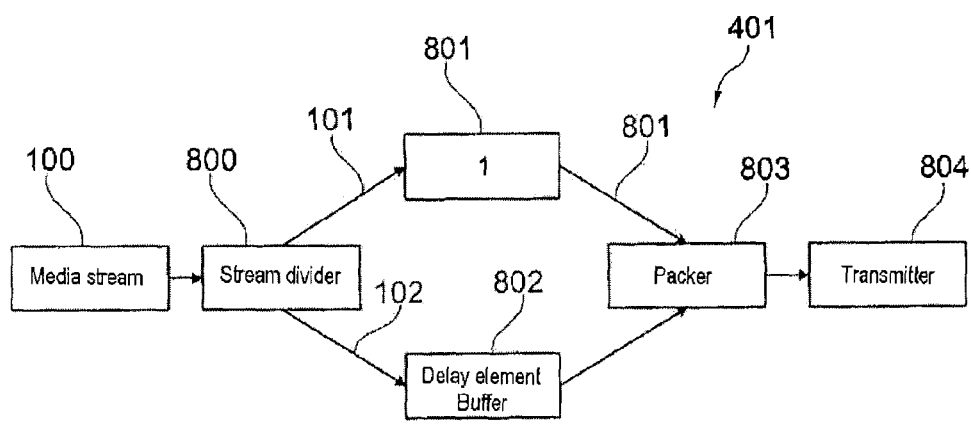
FIG. 9 shows the delaying and packing of two digital substreams by means of the broadcasting system according to an exemplary embodiment of the invention.

FIG. 9 shows the media stream 100 that is divided into a first substream 101 and into a second substream 102 by a stream divider 800. This figure furthermore clearly shows that the second substream is transmitted to the delay element or buffer 802 while the first substream is transmitted to the packer 803 without delay. Subsequently, the thusly delayed and packed data stream is transmitted in accordance with the broadcasting principle by means of a transmitter in the broadcasting system 401. Although this figure shows the utilization of a single transmission path to the receiver, the digital substreams may also be transmitted to the vehicle on different transmission paths.

Figure 10:
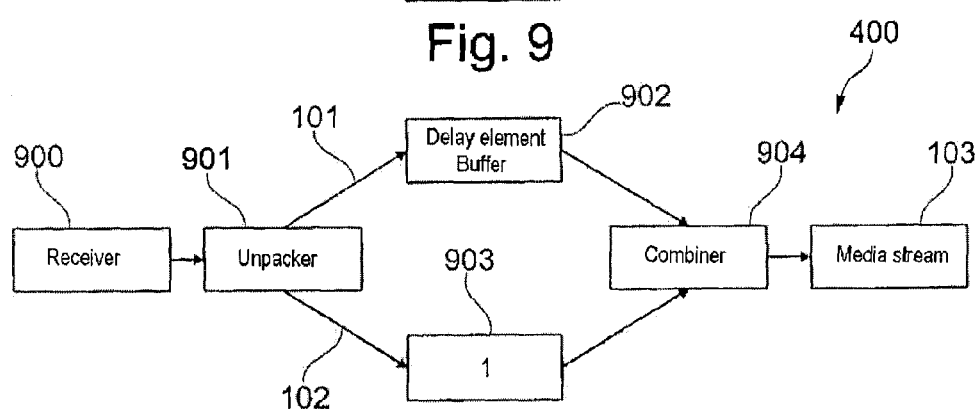
FIG. 10 shows a schematic two-dimensional representation of the unpacking of two digital substreams, as well as the cancellation of a delay between these streams and the combination thereof, by means of the vehicle according to an exemplary embodiment of the invention.

FIG. 10 shows the side of the vehicle 400, on which a receiver 900 is arranged that receives the data of, for example, a transmitter 804 according to FIG. 9. A downstream unpacker 901 once again divides the two substreams 101, 102. In this case, the previously undelayed first substream 101 is delayed by the delay element 902 or buffer within the moving vehicle. The second digital substream 102, in contrast, is not delayed. After the delay of the first digital substream, both streams are combined in the combiner 904 in order to obtain the output stream 103.

Figure 11:
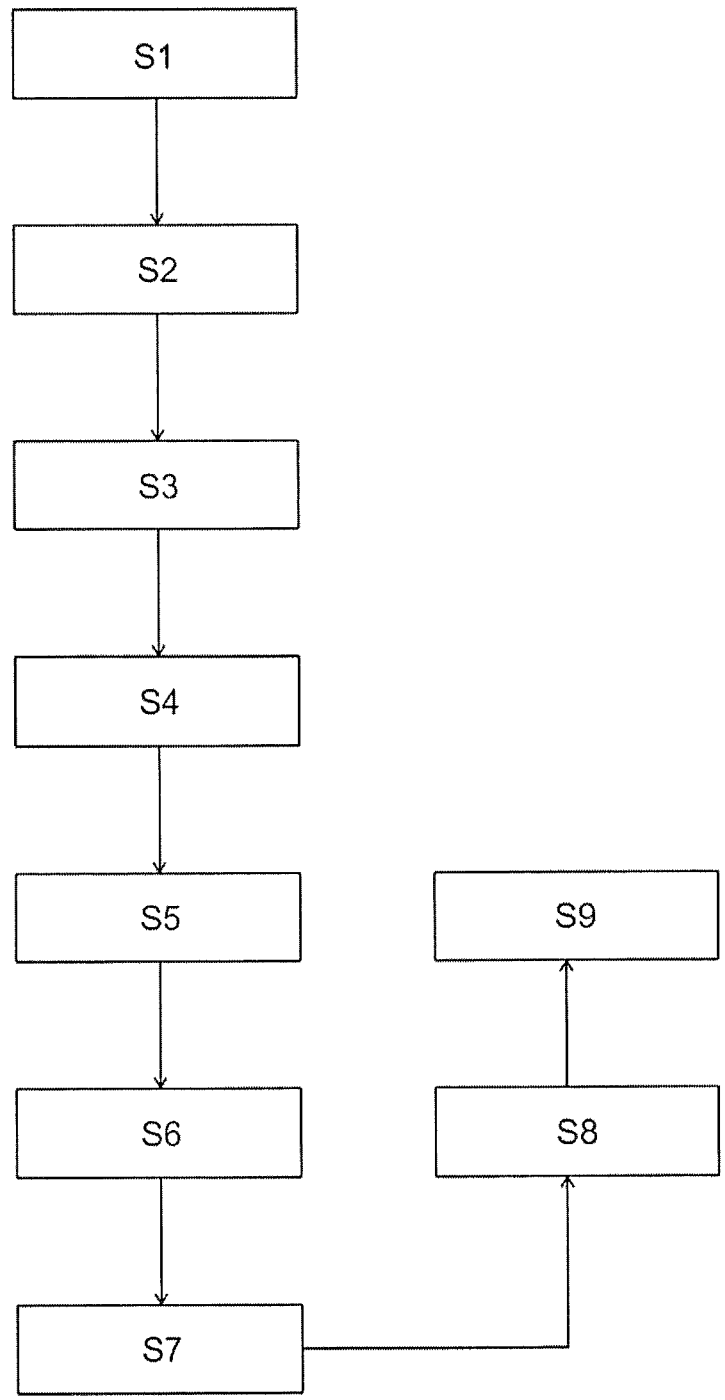
FIG. 11 shows a flow chart of a method according to an exemplary embodiment of the invention

FIG. 11 shows a flow chart of a method according to an exemplary embodiment of the invention. A data stream to be transmitted is made available by a transmitter in step S1 and the data stream is divided into a first digital substream and a second digital substream in step S2, wherein the two substreams are complementary to one another. A time offset dt between the first and the second substream is generated in step S3 and the first and the second substream are transmitted to a receiver in the moving vehicle by the broadcasting system with the time offset dt in step S4 such that the first substream is transmitted earlier than the second substream. The first substream is delayed in the moving vehicle in step S5 and both received substreams are recombined into an output stream in the moving vehicle in step S6. The recombined output stream is played back in the moving means of transport in step S7. The packing of both complementary, time-delayed substreams by means of the broadcasting system takes place in step S8 and the unpacking of both complementary, time-delayed substreams in the moving vehicle takes place in step S9.

The invention claimed is:

1. A digital broadcasting method of a broadcasting system for realizing a seamless reception of a digital data stream in a moving vehicle, wherein the method comprises the steps of:
    providing a data stream of a predetermined initial quality to be transmitted by a transmitter,
    dividing the data stream into a first digital substream and a second digital substream,
    wherein the first and second sub streams are complementary to one another in such a way that a recombination of the substreams results in a data stream of the predetermined initial quality,
    wherein each of the first and second substreams on its own comprises complete information sufficient to reproduce the original content, but a quality reduced content compared to the data stream of the predetermined initial quality to be transmitted,
    generating a time offset dt between the first and the second substream,
    transmitting the first and the second substream to a receiver in the moving vehicle in the form of a broadcast by a broadcasting system with the time offset dt such that the first substream is transmitted earlier than the second substream,
    delaying the first substream in the moving vehicle, and
    recombining both received substreams into an output stream in the moving vehicle.

2. The digital broadcasting method of claim 1, wherein interrelated complementary parts of the first and the second substream are respectively recombined during the recombining.

3. The digital broadcasting method of claim 1, further comprising:
    playing the recombined output stream in the moving vehicle,
    wherein the delaying comprises a storing of a transmitted part of the first substream,
    such that an occurrence of a break in the transmission during the reception of the broadcast with a duration up to the length of the time offset can be compensated in such a way that the playing of the output stream can take place continuously.

4. The digital broadcasting method of claim 1, further comprising:
    packing the first and second complementary, time-delayed substreams by a broadcasting system, and
    unpacking the first and second complementary, time-delayed substreams on the side of the moving vehicle,
    wherein the transmission of the first and second substreams takes place on a single transmission path.

5. The digital broadcasting method of claim 1,
    wherein the data stream to be transmitted is a digital audio stream,
    wherein the dividing comprises the reduction of the audio stream to first and second mono channels,
    wherein the first substream is composed of the data of the first mono channel of the audio stream, and
    wherein the second substream is composed of the data of the second mono channel of the audio stream.

6. The digital broadcasting method of claim 1,
    wherein the data stream to be transmitted is a digital video stream,
    wherein the first substream is selected from the group consisting of pixels with an even ordinal number, data of lines with an even ordinal number, images with an even ordinal number and any combination thereof, and
    wherein the second substream is selected from the group consisting of pixels with an odd ordinal number, data of lines with an odd ordinal number, images with an odd ordinal number and any combination thereof.

7. The digital broadcasting method of claim 6, furthermore comprising:
    calculating intermediate images from the first substream or from the second substream, and
    inserting intermediate images between images in the same substream from which the intermediate images are calculated such that a choppy reproduction on the receiving end is prevented in case a break in the transmission occurs.

8. The digital broadcasting method of claim 1,
    wherein the vehicle is an airplane, and
    wherein a broadcasting system is a ground-based communication station.

9. The digital broadcasting method of claim 1,
    wherein the time offset lies between 10 and 40 seconds.

10. The digital broadcasting method of claim 1,
    wherein the data stream to be transmitted is provided at a time t1,
    wherein the data stream is divided at a time t2, wherein the time offset is generated at a time t3,
    wherein the transmission of the first substream starts at a time t4,
    wherein the transmission of the second substream starts at a time t5,
    wherein t4+dt=t5 applies,
    wherein the transmission of a first part of the first substream to the receiving end takes place at a time t6,
    wherein the transmission of a first part of the second substream to the receiving end takes place at a time t7, wherein the recombination of both substreams takes place no earlier than the time t7, and wherein t1 t2 t3 t4 t5 t6 t7 applies.

11. A broadcasting system for broadcasting a digital data stream, wherein the broadcasting system comprises:
- a device for dividing the data stream of a predetermined initial quality into a first digital substream and a second digital substream,
- wherein the first and second substreams are complementary to one another in such a way that a recombination of the substreams results in a data stream of the predetermined initial quality,
- wherein each of the first and second substreams on its own comprises complete information sufficient to reproduce the original content, but a quality reduced content compared to the data stream of the predetermined initial quality to be transmitted,
- a device for generating a time offset dt between the first and the second sub stream, and
- a device for transmitting the first and the second substream to a receiver in the moving vehicle with the time delay dt in the form of a broadcast by the broadcasting system such that the first substream is transmitted earlier than the second substream.

12. An airplane, wherein the airplane comprises:
- a receiver for receiving first and second complementary, time- delayed digital substreams,
- wherein each of the first and second substreams on its own comprises complete information sufficient to reproduce the original content, but a quality reduced content compared to the data stream of a predetermined initial quality to be transmitted,
- wherein the first and second sub streams are complementary to one another in such a way that a recombination of the substreams results in a data stream of the predetermined initial quality,
- a device for delaying the first sub stream, and
- a device for recombining both received substreams into an output stream.

13. A non-transitory computer- readable medium, on which a program element is stored that, when executed on a processor, instructs the processor to carry out the following steps:
- providing a data stream of a predetermined initial quality to be transmitted by means of a transmitter,
- dividing the data stream into a first digital substream and a second digital substream,
- wherein the first and second substreams are complementary to one another in such a way that a recombination of the substreams results in a data stream of the predetermined initial quality,
- wherein each of the first and second substreams on its own comprises complete information sufficient to reproduce the original content, but a quality reduced content compared to the data stream of the predetermined initial quality to be transmitted,
- generating a time offset dt between the first and the second substream, and
- transmitting the first and the second substream to a receiver in the moving vehicle with the time delay dt in the form of a broadcast by the broadcasting system such that the first substream is transmitted earlier than the second substream.

* * * * *